(12) United States Patent
Kawasaki et al.

(10) Patent No.: US 11,091,821 B2
(45) Date of Patent: Aug. 17, 2021

(54) COPPER-BASED ALLOY

(71) Applicant: TOYOTA JIDOSHA KABUSHIKI KAISHA, Toyota (JP)

(72) Inventors: Minoru Kawasaki, Toyota (JP); Natsuki Sugiyama, Nissin (JP); Hisao Fukuhara, Toyota (JP); Tadashi Oshima, Nagakute (JP); Hajime Kato, Nagakute (JP); Kouji Tanaka, Nagakute (JP); Takashi Saito, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/292,767

(22) Filed: Mar. 5, 2019

(65) Prior Publication Data
US 2019/0276916 A1 Sep. 12, 2019

(30) Foreign Application Priority Data
Mar. 9, 2018 (JP) .............................. JP2018-043018

(51) Int. Cl.
*C22C 9/06* (2006.01)
*B23K 35/30* (2006.01)

(52) U.S. Cl.
CPC .............. *C22C 9/06* (2013.01); *B23K 35/302* (2013.01)

(58) Field of Classification Search
CPC ................................. C22C 9/06; B23K 35/302
USPC ........................................................ 420/471
See application file for complete search history.

(56) References Cited

U.S. PATENT DOCUMENTS

| | | | |
|---|---|---|---|
| 5,188,799 A | 2/1993 | Mori et al. | |
| 5,843,243 A | 12/1998 | Kawasaki et al. | |
| 2004/0045641 A1 | 3/2004 | Kawasaki et al. | |
| 2006/0239853 A1 | 10/2006 | Maehara et al. | |
| 2010/0158748 A1 | 6/2010 | Xu et al. | |
| 2016/0186296 A1* | 6/2016 | Hatano ..................... | C22C 9/06 |
| | | | 420/471 |
| 2017/0037495 A1* | 2/2017 | Kawasaki ................. | F01L 5/24 |
| 2017/0253950 A1 | 9/2017 | Shinohara et al. | |

FOREIGN PATENT DOCUMENTS

| | | |
|---|---|---|
| CN | 1143685 A | 2/1997 |
| CN | 1856588 A | 11/2006 |
| CN | 101440445 A | 5/2009 |
| CN | 103484714 a | 1/2014 |
| CN | 104046816 A | 9/2014 |
| CN | 105518166 A | 4/2016 |
| CN | 106103756 A | 11/2016 |
| CN | 106435247 A | 2/2017 |
| CN | 107151751 A | 9/2017 |
| GB | 519902 A | 4/1940 |

(Continued)

OTHER PUBLICATIONS

Machine Translation CN-1143685-A (Year: 1997).*

*Primary Examiner* — Coris Fung
*Assistant Examiner* — Danielle Carda
(74) *Attorney, Agent, or Firm* — Oliff PLC

(57) ABSTRACT

A copper-based alloy which includes Cu, Ni, Si, Fe, and Mg, and at least one selected from the group consisting of Mo, W, and V, and in which a content of Mg is 0.02 mass % or more. The copper-based alloy exhibits wear resistance and improved weldability with respect to a substrate.

9 Claims, 5 Drawing Sheets

(56) References Cited

FOREIGN PATENT DOCUMENTS

| | | |
|---|---|---|
| JP | H04-297536 A | 10/1992 |
| JP | H08-225868 A | 9/1996 |
| JP | 2004-307905 A | 11/2004 |
| JP | 4114922 B2 | 7/2008 |
| JP | 2017-036470 A | 2/2017 |

\* cited by examiner

COPPER-BASED ALLOY

INCORPORATION BY REFERENCE

The disclosure of Japanese Patent Application No. 2018-043018 filed on Mar. 9, 2018 including the specification, drawings and abstract is incorporated herein by reference in its entirety.

BACKGROUND

1. Technical Field

The present disclosure relates to a copper-based alloy.

2. Description of Related Art

In the related art, a technology in which a material having excellent characteristics is clad on a surface of an aluminum substrate or the like is used as a surface processing treatment for a substrate in order to improve wear resistance, heat resistance, corrosion resistance, and the like. Mechanical members require different mechanical properties according to the part. For example, a cylinder head and an engine block of an internal combustion engine (hereinafter referred to as an engine) are required to have high wear resistance and the like in sliding parts. Here, there is a valve seat that is provided as a part in the vicinity of intake and exhaust ports of a cylinder head and repeatedly comes in contact with an edge of a valve head of intake and exhaust valves that slowly rotate. The intake side valve seat is exposed to air that flows in at a high speed and an air mixture containing various fuel components, and the exhaust side valve seat is exposed to a high temperature combustion gas that flows out at a high speed. Under such a severe environment, high wear resistance (in particular, adhesive wear resistance), lubricity, and the like are required for the valve seat. According to a cladding type valve seat formed by cladding using a laser cladding method, not only is the diameter of intake and exhaust ports enlarged but also the thermal conductivity of the valve seat itself can be improved and cooling performance in the vicinity of a valve system can be improved due to shortening of a distance from a water jacket on the side of the cylinder head.

In Japanese Unexamined Patent Application Publication No. 2017-36470 (JP 2017-36470 A), Japanese Unexamined Patent Application Publication No. 4-297536 (JP 4-297536 A), Japanese Unexamined Patent Application Publication No. 8-225868 (JP 8-225868 A), and Japanese Patent No. 4114922, copper-based alloys having characteristics suitable for such a cladding part and its raw material powder are disclosed. For example, in JP 2017-36470 A, a wear resistance copper-based alloy which includes molybdenum and the like and a niobium carbide and in which a content of chromium is less than 1.0% (by weight %), and which includes a matrix and hard particles dispersed in the matrix, and in which the hard particles contain a niobium carbide, Nb—C—Mo in the vicinity thereof, and the like is described. It is disclosed in JP 2017-36470 A that, when a content of chromium is less than a specific amount, an oxide film formed of a niobium carbide, molybdenum, and the like is likely to be formed on the metal surface, and excellent wear resistance is obtained.

SUMMARY

However, if weldability with respect to a substrate of a cladding part is low when laser cladding is performed on an aluminum alloy substrate or the like, there is a problem that laser cladding must be performed in conditions of a high output and a low speed in order to increase the weldability. Therefore, it is desirable that the weldability of the raw material powder forming a cladding part with respect to substrate such as an aluminum alloy with a laser be further improved and excellent wear resistance be maintained.

In this manner, a copper-based alloy of the related art does not have characteristics which are sufficient in consideration of maintaining wear resistance and improvement in weldability with respect to a substrate, and thus further improvement is necessary.

The present disclosure provides a copper-based alloy having excellent weldability with respect to a substrate and sufficient wear resistance.

The inventors have found that, in a copper-based alloy including Cu (copper), Ni (nickel), Si (silicon), Fe (iron), and Mg (magnesium), and at least one selected from the group consisting of Mo (molybdenum), W (tungsten) and V (vanadium) (hereinafter referred to as Mo or the like), when Mg is added in a specific amount or more, it is possible to maintain wear resistance and further improve the weldability with respect to a substrate.

A first aspect of the present disclosure is a copper-based alloy which includes Cu, Ni, Si, Fe, and Mg, and at least one selected from the group consisting of Mo, W, and V, and in which a content of Mg is 0.02 mass % or more.

The first aspect may include Ni: 5.0 mass % to 30.0 mass %; Si: 0.5 mass % to 5.0 mass %; Fe: 2.0 mass % to 20.0 mass %; at least one selected from the group consisting of Mo, W, and V: 3.0 mass % to 20.0 mass %; and Mg: 0.02 mass % to 5.0 mass %. In the first aspect, the remainder may include Cu and inevitable impurities.

The first aspect may include Ni: 5.0 mass % to 30.0 mass %; Si: 0.5 mass % to 5.0 mass %; Fe: 3.0 mass % to 20.0 mass %; at least one selected from the group consisting of Mo, W, and V: 3.0 mass % to 20.0 mass %; and Mg: 0.02 mass % to 2.0 mass %. In the first aspect, the remainder may include Cu and inevitable impurities.

The first aspect may include Ni: 10.0 mass % to 20.0 mass %; Si: 1.0 mass % to 5.0 mass %; Fe: 2.0 mass % to 15.0 mass %; at least one selected from the group consisting of Mo, W and V: 8.0 mass % to 10.0 mass %; and Mg: 0.02 mass % to 5.0 mass %. In the first aspect, the remainder may include Cu and inevitable impurities.

The first aspect may include Ni: 5.0 mass % to 20.0 mass %; Si: 0.5 mass % to 5.0 mass %; Fe: 3.0 mass % to 20.0 mass %; at least one selected from the group consisting of Mo, W and V: 3.0 mass % to 20.0 mass %; and Mg: 0.02 mass % to 5.0 mass %. In the first aspect, the remainder may include Cu and inevitable impurities.

The copper-based alloy of the first aspect may be used as a cladding alloy.

The copper-based alloy of the first aspect may constitute a cladding part.

The copper-based alloy of the first aspect may be used for a valve system member for an internal combustion engine or sliding member.

The copper-based alloy of the present disclosure has excellent weldability with respect to a substrate and sufficient wear resistance.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
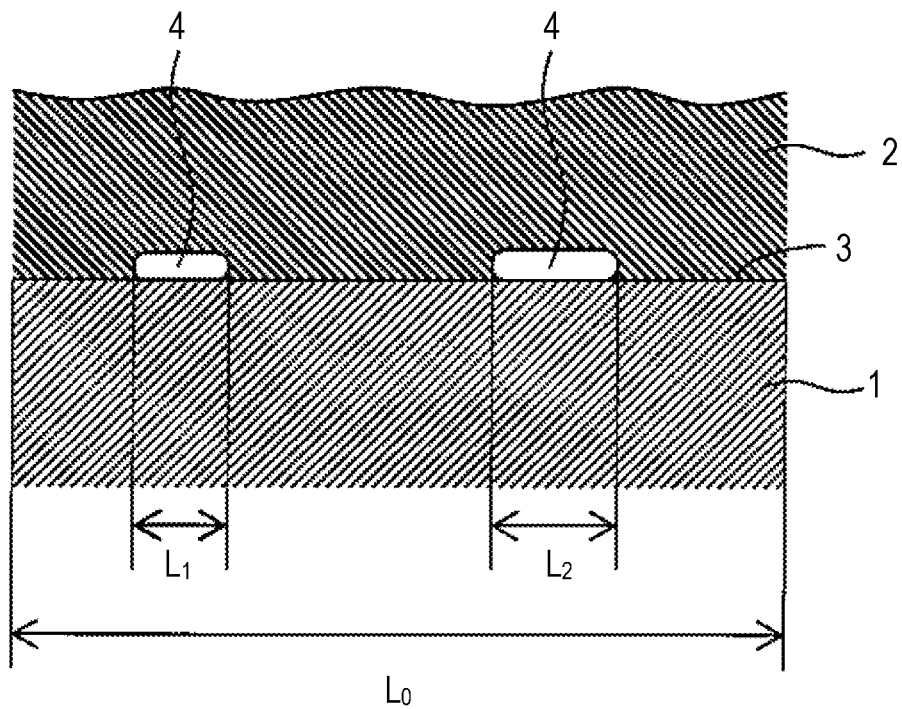
FIG. 1 is a longitudinal sectional view showing an unwelded part generated in the vicinity of an interface between a substrate and a cladding layer.

The present disclosure relates to a copper-based alloy which includes Cu, Ni, Si, Fe, Mg, and at least one selected from the group consisting of Mo, W, and V, and in which a content of Mg is 0.02 mass % or more (hereinafter referred to as a copper-based alloy of the present disclosure). Since a specific amount of Mg is added to a copper-based alloy including Cu, Ni, Si, Fe, Mg, and Mo, and the like, according to an oxide film destroying action on a surface of a substrate due to Mg in a cladding, the copper-based alloy of the present disclosure has excellent weldability with respect to the substrate and has sufficient wear resistance.

The copper-based alloy of the present disclosure includes specific essential elements and a specific amount of Mg is added thereto. Thereby, a surface oxide film present on the surface of the substrate such as an aluminum alloy is destroyed and weldability with respect to the substrate is improved. Concurrently, since Mg effectively acts as a copper-based matrix strengthening element, the wear resistance of the copper-based alloy is thought to be maintained. In order to improve the weldability or improve wear characteristics, it is conceivable to use the following methods. However, in either case, since improvement in weldability with respect to a substrate and improvement in wear characteristics are contrary to each other, if improvement in weldability with respect to a substrate is attempted, wear characteristics deteriorate. Therefore, it can be said that the present disclosure has a surprising effect that the weldability becomes excellent when Mg is added and sufficient wear resistance can be maintained. Specifically, when surface oxides of a substrate are destroyed using a low melting point eutectic such as NiSi and NiB and thus the weldability is improved and secured, there is a limit to sufficiently destroying surface oxides only with such a eutectic. On the other hand, in order to improve wear characteristics, it is necessary to improve lubricating properties and slip resistance properties. Elements such as P, B, and S that are added in order to improve lubricating properties are not suitable for use in laser cladding due to fume generation and toxicity problems, and make it difficult to form a powder. In addition, when the size of hard particles is increased in order to improve sliding wear resistance characteristics, there is a problem that the machinability and cladding properties (cracking properties) of the copper-based alloy deteriorate. Therefore, although addition of Mn, Al, and the like as copper-based matrix strengthening elements has been studied, all of the elements have a trade-off relationship with cladding properties. In addition, all of the elements have an effect of making the copper-based alloy powder finer and thus wear characteristics deteriorate.

Mg is contained in an amount of 0.02 mass % or more in the copper-based alloy of the present disclosure as an essential component. In order to maintain wear resistance and improve weldability with respect to a substrate, the content of Mg can be, for example, 5.0 mass % or less, 2.0 mass % or less, 1.6 mass % or less, 1.0 mass % or less, 0.50 mass % or less, 0.30 mass % or less or 0.25 mass % or less.

"Copper-based alloy" in this specification refers to an alloy in which Cu is contained in an amount greater than that of other elements in the entire alloy. In addition, the copper-based matrix refers to a matrix in which Cu is contained in an amount of more than that of the other elements in the entire matrix.

A range of "x to y" in this specification includes the lower limit value x and the upper limit value y. A range such as "a to b" can be newly set as a new lower limit value and upper limit value using various numerical values or arbitrary numerical value ranges illustrated in this specification.

The copper-based alloy of the present disclosure includes various modifying elements (for example, a total of 5 mass % or less, preferably 2 mass % or less, and particularly 1 mass % or less) and elements which are difficult to remove technically or in terms of cost as inevitable impurities. Here, "%" in the component composition in this specification refers to "mass %" unless otherwise specified.

The copper-based alloy of the present disclosure includes these before cladding and after cladding. For example, a cladding alloy may be a raw material powder to be subjected to cladding or may be a cladding part having a metal structure in which hard particles are dispersed in a copper-based matrix due to cladding.

The "hard particles" in this specification refer to particles having a higher hardness than a copper-based matrix, and may be appropriately referred to as dispersed particles.

Regarding the composition of the copper-based alloy of the present disclosure, selection and proportions of elements are adjusted according to the characteristics or structure required for the cladding part. However, for example, the following compositions are preferable. Incidentally, in the composition described here, the entire copper-based alloy is set as 100 mass %.

In order to achieve both maintaining wear resistance and improvement in weldability with respect to a substrate, the copper-based alloy of the present disclosure preferably includes, by mass %, Ni: 5.0% to 30.0%; Si: 0.5% to 5.0%; Fe: 2.0% to 20.0%; at least one selected from the group consisting of Mo, W and V: 3.0% to 20.0%; and Mg: 0.02% to 5.0%, in which the remainder includes Cu and inevitable impurities. Also in consideration of this, the copper-based alloy of the present disclosure more preferably includes, by mass %, Ni: 5.0% to 20.0%; Si: 1.0% to 3.5%; Fe: 4.0% to 15.0%; at least one selected from the group consisting of Mo, W and V: 3.0% to 15.0%; and Mg: 0.02% to 2.0%, in which the remainder includes Cu and inevitable impurities.

A content of Ni is preferably 5.0% to 30.0%, more preferably 5.0% to 20.0%, and particularly preferably 10.0% to 18.0%. A part of Ni is solid-solutionized in copper to increase the toughness of a copper-based matrix and the other part forms a hard silicide containing Ni as a main component and is dispersed to increase the wear resistance. Ni forms a hard phase of hard particles together with Fe, Mo, and the like. Ni secures characteristics of a copper-nickel-based alloy such as a particularly good corrosion resistance, heat resistance, and wear resistance, and allows sufficient hard particles to be generated and thus secures toughness, and makes it possible to reduce generation of cracks when a cladding part is formed, and cladding properties with respect to an object to be maintained when additional cladding is performed. When a content of Ni is too small, an effect of improving the matrix strength is weak, and when a content of Ni is too large, hard particles become fine and thus the wear resistance decreases.

A content of Si is preferably 0.5% to 5.0%, more preferably 1.0% to 3.5%, and particularly preferably 1.5% to 3.0%. Si is an element that forms silicides, and forms a silicide containing Ni as a main component or a silicide containing Mo (or W, V) as a main component, and additionally contributes to strengthening a copper-based matrix. When a content of nickel silicide is small, the weldability with respect to a substrate deteriorates. In addition, a silicide containing Mo (or W, V) as a main component has a function of maintaining high temperature lubricity of the copper-based alloy of the present disclosure. Si allows sufficient hard particles to be generated and thus secures toughness, and makes it possible to reduce generation of cracks when a cladding part is formed, and cladding properties with respect to an object to be maintained when additional cladding is performed. When a content of Si is too small, such effects are weak, and when a content of Si is too large, the toughness of hard particles decreases and the occurrence of cracks is induced.

A content of Fe is preferably 2.0% to 20.0%, more preferably 4.0% to 15.0%, and particularly preferably 5.0% to 10.0%. Fe is not easily solid-solutionized in a copper-based matrix and mainly contributes to forming hard particles as a Fe—Mo type, Fe—W type or Fe—V type silicide. When a content of Fe is too small, generation of hard particles becomes insufficient and the wear resistance decreases, and when a content of Fe is too large, hard particles become coarse and cladding properties and the machinability deteriorate.

A content of at least one selected from the group consisting of Mo, W, and V is preferably 3.0% to 20.0%, more preferably 3.0% to 15.0%, and particularly preferably 5.0% to 10.0%. Mo and the like combine with Si to form silicides (Fe—Mo type silicide having toughness) hard particles and the wear resistance and lubricity at high temperatures then increase. This silicide has a lower hardness and higher toughness than a Co—Mo type silicide. When a silicide is formed in hard particles, the wear resistance and lubricity at high temperatures increase. When an amount of hard particles is in excess, the toughness is impaired, the crack resistance decreases, and cracks are likely to occur. When a content of Mo or the like is too small, such effects are weak, and when a content of Mo or the like is too large, hard particles become coarse, and cladding properties and cutting properties deteriorate.

The copper-based alloy of the present disclosure may include 1.0% to 15.0%, and preferably 1.0% to 10.0% of Cr (chromium). Cr increases the oxidation resistance of a copper-based alloy according to formation of an oxide film. However, since Cr is an element having a high environmental burden, the copper-based alloy of the present disclosure preferably does not substantially include Cr, for example, Cr≤1%, and preferably Cr<0.01%.

The copper-based alloy of the present disclosure may include 1.0% to 15.0%, and preferably 2.0% to 15.0% of Co (cobalt). Co forms a solid solution with Ni, Fe, Cr and the like to improve the toughness. When a content of Co is large, Co is incorporated into the nickel silicide structure, and thus the crack resistance decreases. In addition, when Co is contained, it is possible to improve the heat resistance. However, since Co is expensive as a rare element and there is a risk with supply, the copper-based alloy of the present disclosure preferably does not substantially include Co, for example, Co≤1% (for example, 0.01% to 0.94%), and preferably Co<0.01%.

The copper-based alloy of the present disclosure may include 0.01% to 5.0%, and preferably 0.3% to 3.0% of NbC (niobium carbide). NbC has an effect of generating nuclei for hard particles and allows hard particles to be made finer, and can contribute to obtaining both crack resistance and wear resistance.

A copper-based alloy according to one embodiment of the present disclosure includes, by mass %, Ni: 5.0% to 30.0%; Si: 0.5% to 5.0%; Fe: 3.0% to 20.0%; at least one selected from the group consisting of Mo, W, and V: 3.0% to 20.0%; and Mg: 0.02% to 2.0%, in which the remainder includes Cu and inevitable impurities (Embodiment 1). Preferably, the present embodiment includes, by mass %, Ni: 10.0% to 20.0%; Si: 1.0% to 3.0%; Fe: 5.0% to 10.0%; at least one selected from the group consisting of Mo, W, and V: 5.0% to 10.0%; and Mg: 0.02% to 2.0%, in which the remainder includes Cu and inevitable impurities. In the present embodiment, Cr: 1.0% or less and NbC: 0.01% to 5.0% may be further included.

A copper-based alloy according to another embodiment of the present disclosure includes, by mass %, Ni: 10.0% to 20.0%; Si: 1.0% to 5.0%; Fe: 2.0% to 15.0%; at least one selected from the group consisting of Mo, W and V: 8.0% to 10.0%; and Mg: 0.02% to 5.0%, in which the remainder includes Cu and inevitable impurities (Embodiment 2). Preferably, the present embodiment includes, by mass %, Ni: 10.0% to 20.0%; Si: 1.0% to 3.0%; Fe: 5.0% to 10.0%; at least one selected from the group consisting of Mo, W and V: 8.0% to 10.0%; and Mg: 0.02% to 2.0%, in which the remainder includes Cu and inevitable impurities. In the present embodiment, Cr: 1.0% to 10.0% and Co: 2.0% to 15.0% may be further included.

A copper-based alloy according to still another embodiment of the present disclosure includes, by mass %, Ni: 5.0% to 20.0%; Si: 0.5% to 5.0%; Fe: 3.0% to 20.0%; at least one selected from the group consisting of Mo, W and V: 3.0% to 20.0%; and Mg: 0.02% to 5.0%, in which the remainder includes Cu and inevitable impurities (Embodiment 3). Preferably, the present embodiment includes, by mass %, Ni: 10.0% to 20.0%; Si: 0.5% to 3.0%; Fe: 5.0% to 10.0%; at least one selected from the group consisting of Mo, W and V: 5.0% to 10.0%; and Mg: 0.02% to 1.0%, in which the remainder includes Cu and inevitable impurities. In the present embodiment, in order to improve the machinability of the cladding part, S (sulfur): 0.05% to 0.5%: and Ti (titanium): 0.1% to 1.0% are additionally preferably included. In the present embodiment, Cr: 1.0% to 15.0% and Co: 0.01% to 0.94% may be further included.

The copper-based alloy of the present disclosure can be used as a cladding alloy to be clad on an object. In the present disclosure, a method of forming a cladding part is not limited. For example, according to a laser cladding method, it is possible to form a cladding part having a desired metal structure or characteristics.

The laser cladding method is a method in which a supplied cladding alloy material (raw material) is melted in a predetermined temperature range using a high density energy heat source such as a laser beam or an electron beam, the melt is rapidly solidified on the surface of the substrate, and a cladding part having a predetermined metal structure (rapidly solidified structure) is formed.

It is conceivable to use a wire material or a bar material as a raw material. In order to uniformly or stably form a desired metal structure, a powder is preferably used. Such a raw material powder can be obtained by, for example, a (gas) atomization method. Particles constituting an atomized powder are also one form of the cladding alloy of the present disclosure.

Examples of a material of an object to be clad include aluminum, an aluminum-based alloy, iron or an iron-based alloy, copper or a copper-based alloy. Examples of a basic composition of an aluminum alloy constituting an object include a casting aluminum alloy, for example, Al—Si type, Al—Cu type, Al—Mg type, and Al—Zn type alloys. Examples of an object include an engine such as an internal combustion engine. In the case of an internal combustion engine, a valve system material may be exemplified. In this case, it may be applied to a valve seat constituting an exhaust port or may be applied to a valve seat constituting an intake port. In this case, the valve seat itself may be constituted with the copper-based alloy of the present disclosure, or the copper-based alloy of the present disclosure may be clad on the valve seat. However, the copper-based alloy of the present disclosure is not limitedly used as a valve system material of an engine such as an internal combustion engine, and can be used as a sliding material, a sliding member, and a sintered product of other systems for which wear resistance is required.

The copper-based alloy of the present disclosure has excellent weldability with respect to a substrate, and a welding lower limit laser output measured according to a method described in the following "(1) Weldability test" is preferably 0.86 or less where 1 represents the case in which no Mg is included.

In the copper-based alloy of the present disclosure, the wear resistance of a copper-based alloy of the related art in which no Mg is included is maintained or improved, and a wear amount measured according to a method described in the following "(2) Wear resistance test" is preferably 6.5 mg or less, more preferably 4.5 mg or less, and particularly preferably 4.0 mg or less.

The copper-based alloy of the present disclosure can have sufficient strength for use particularly for cladding, and a breaking strength measured according to a method described in "(3) Tensile strength test" is preferably 1.05 to 1.45 where 1 represents the case in which no Mg is included.

While the present disclosure will be described below with reference to examples, the present disclosure is not limited to the scope of the examples.

«Production of Samples»

(1) An aluminum alloy (JIS AC2C) was prepared as a substrate on which substrate cladding was performed. The shape of the substrate was a ring shape: (outer diameter φ80 mm×inner diameter φ20 mm×height 50 mm) for a wear resistance test and a weldability test. The tensile strength test was performed according to JIS Z2201 (test piece shape No. 13B) and JIS Z2241.

(2) Raw Material Powders

For raw material powders, gas atomized powders having component compositions (blending compositions) shown in Table 1-1 and Table 1-2 were prepared. The obtained gas atomized powders were classified by sieving. In this manner, a powder adjusted to have a grain size of 32 μm to 180 μm was subjected to cladding.

TABLE 1

| | | Component (mass %) | | | | | | | | | |
|---|---|---|---|---|---|---|---|---|---|---|---|
| | | Cu | Ni | Si | Fe | Mo | Nb | O | C | Co | Pb |
| Embodiment 1 | Comparative Example 1 | Remainder | 17.2 | 2.89 | 9.03 | 6.49 | 0.93 | 0.011 | 0.034 | — | Less than 0.001 |
| | Example 1 | Remainder | 17.2 | 2.89 | 8.94 | 6.58 | 0.98 | 0.016 | 0.058 | — | 0.001 |
| | Example 2 | Remainder | 17.3 | 2.69 | 9.06 | 6.55 | 0.98 | 0.015 | 0.067 | — | 0.001 |
| | Example 3 | Remainder | 17.3 | 2.79 | 8.92 | 6.55 | 0.99 | 0.028 | 0.062 | — | 0.001 |
| | Example 4 | Remainder | 17.4 | 2.86 | 9.01 | 6.55 | 1.01 | 0.041 | 0.066 | — | 0.001 |
| Embodiment 2 | Comparative Example 2 | Remainder | 15.6 | 2.09 | 6.61 | 9.59 | — | 0.016 | Less than 0.01 | — | Less than 0.01 |
| | Example 5 | Remainder | 15.9 | 2.24 | 7.45 | 9.09 | — | 0.021 | 0.021 | — | Less than 0.001 |
| | Example 6 | Remainder | 16.1 | 2.08 | 7.03 | 9 | — | 0.017 | 0.02 | — | Less than 0.001 |
| | Example 7 | Remainder | 15.9 | 2.14 | 7.34 | 8.95 | — | 0.024 | 0.022 | — | Less than 0.001 |
| | Example 8 | Remainder | 15.8 | 2.12 | 7.31 | 8.8 | — | 0.053 | 0.023 | — | Less than 0.001 |
| | Example 9 | Remainder | 16.1 | 2.13 | 7.81 | 9.09 | — | 0.025 | 0.019 | — | Less than 0.001 |
| Embodiment 3 | Comparative Example 3 | Remainder | 17.3 | 2.83 | 8.32 | 7.92 | — | 0.015 | 0.043 | — | Less than 0.01 |
| | Example 10 | Remainder | 17.5 | 2.71 | 8.37 | 7.93 | — | 0.029 | 0.054 | — | Less than |

TABLE 1-continued

| | | | | | | | | | | |
|---|---|---|---|---|---|---|---|---|---|---|
| Example 11 | Remainder | 17.4 | 2.77 | 8.3 | 8.08 | — | 0.025 | 0.055 | — | 0.001 Less than 0.001 |

| | | Component (mass %) | | | | | | | | |
|---|---|---|---|---|---|---|---|---|---|---|
| | | Al | P | S | Sn | Zn | Bi | Sb | Mg | Ti |
| Embodiment 1 | Comparative Example 1 | 0.015 | 0.02 | 0.004 | Less than 0.005 | Less than 0.001 | Less than 0.001 | Less than 0.001 | — | — |
| | Example 1 | 0.0018 | 0.027 | 0.004 | Less than 0.005 | Less than 0.001 | Less than 0.001 | Less than 0.001 | 0.02 | — |
| | Example 2 | 0.013 | 0.025 | 0.004 | Less than 0.005 | Less than 0.001 | Less than 0.001 | Less than 0.001 | 0.046 | — |
| | Example 3 | 0.028 | 0.029 | 0.003 | Less than 0.005 | 0.002 | Less than 0.001 | Less than 0.001 | 0.21 | — |
| | Example 4 | 0.018 | 0.02 | 0.004 | Less than 0.005 | Less than 0.001 | Less than 0.001 | Less than 0.001 | 1.53 | — |
| Embodiment 2 | Comparative Example 2 | 0.01 | Less than 0.01 | Less than 0.01 | Less than 0.01 | Less than 0.01 | Less than 0.01 | Less than 0.01 | — | — |
| | Example 5 | 0.012 | 0.026 | 0.006 | Less than 0.005 | Less than 0.001 | Less than 0.001 | 0.001 | 0.054 | — |
| | Example 6 | 0.019 | 0.027 | — | Less than 0.005 | 0.002 | Less than 0.001 | Less than 0.001 | 0.114 | — |
| | Example 7 | 0.026 | 0.018 | 0.001 | Less than 0.005 | 0.002 | Less than 0.001 | Less than 0.001 | 0.19 | — |
| | Example 8 | 0.009 | 0.019 | 0.005 | Less than 0.005 | Less than 0.001 | Less than 0.001 | Less than 0.001 | 0.93 | — |
| | Example 9 | 0.008 | 0.025 | — | Less than 0.005 | Less than 0.001 | Less than 0.001 | 0.001 | 0.27 | — |
| Embodiment 3 | Comparative Example 3 | Less than 0.05 | Less than 0.05 | 0.12 | Less than 0.05 | Less than 0.05 | Less than 0.05 | Less than 0.05 | — | 0.35 |
| | Example 10 | 0.011 | 0.019 | 0.12 | Less than 0.005 | 0.001 | Less than 0.001 | Less than 0.001 | 0.1 | 0.34 |
| | Example 11 | 0.009 | 0.019 | 0.14 | Less than 0.005 | Less than 0.001 | Less than 0.001 | Less than 0.001 | 0.22 | 0.33 |

(3) Cladding

For a sample used for the following wear resistance test and tensile strength test, cladding was performed using a laser cladding device using a semiconductor laser beam (LD) as a heat source.

«Tests»

(1) With a weldability test substrate, using a laser cladding device using a semiconductor laser beam (LD) as a heat source, a welding lower limit laser output at which a deposition efficiency was 80% or more was measured.

The deposition efficiency was computed as follows. Substrates 1 and cladding layers 2 in FIG. 1 were cut in a longitudinal direction along the center of the cladding layer, its cross section was observed under an optical microscope, and thus a length $L_0$ of the cross section of the substrate in the longitudinal direction and lengths $L_1$, $L_2$ . . . of unwelded parts 4 present at an interface 3 between the substrate and the cladding layer in the longitudinal direction were measured, and a deposition efficiency (%) was calculated according to the following formula.

Deposition efficiency=$(L_0-\Sigma L_i)/L_0 \times 100$

Figure 2A:
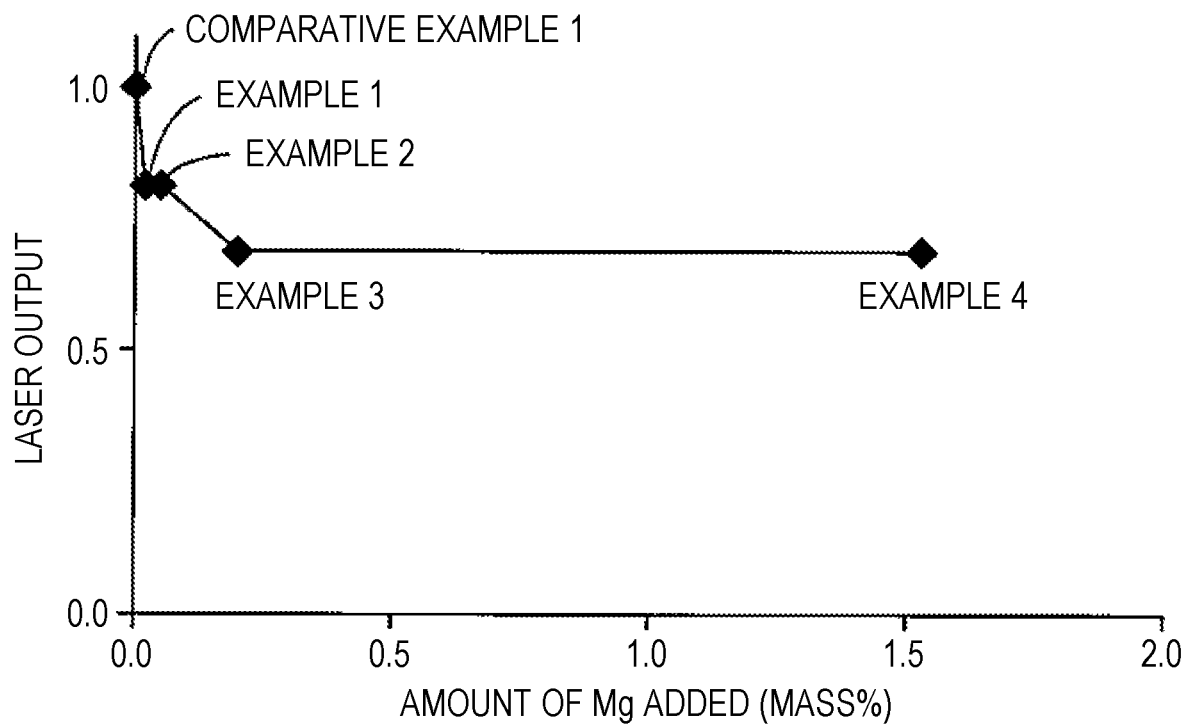
FIG. 2A is a graph showing results of a weldability test for copper-based alloys of Examples 1 to 4 and Comparative Example 1.
Figure 2B:
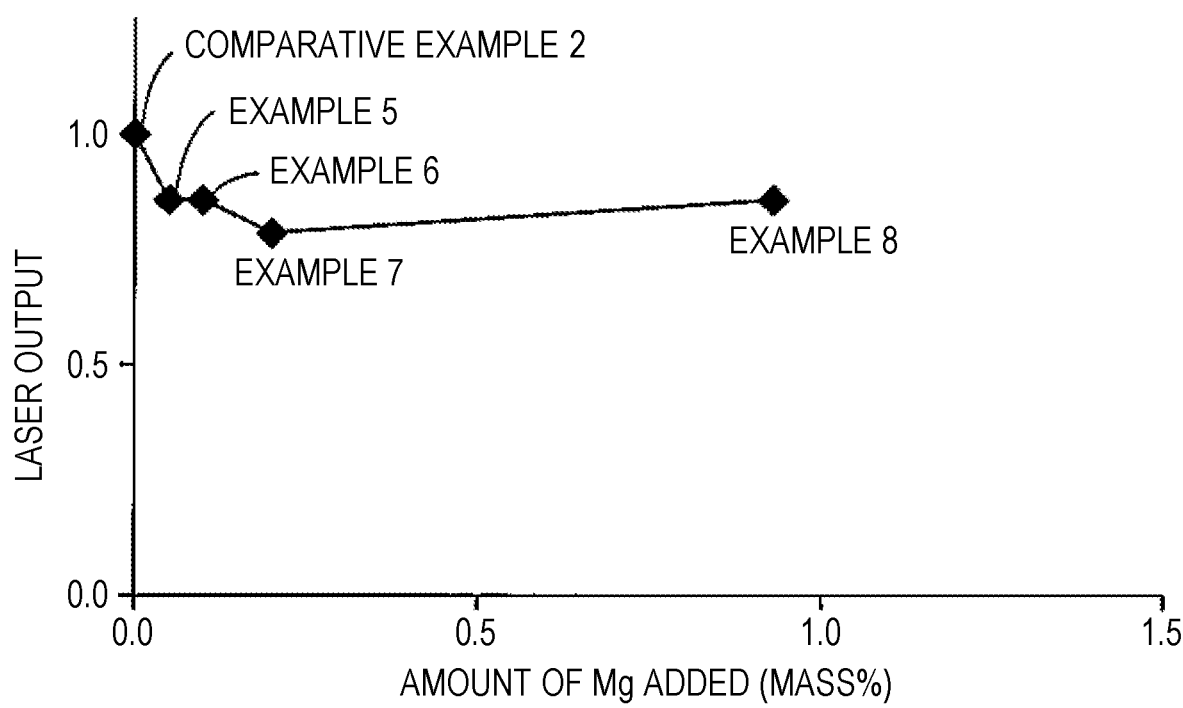
FIG. 2B is a graph showing results of a weldability test for copper-based alloys of Examples 5 to 8 and Comparative Example 2.
Figure 2C:
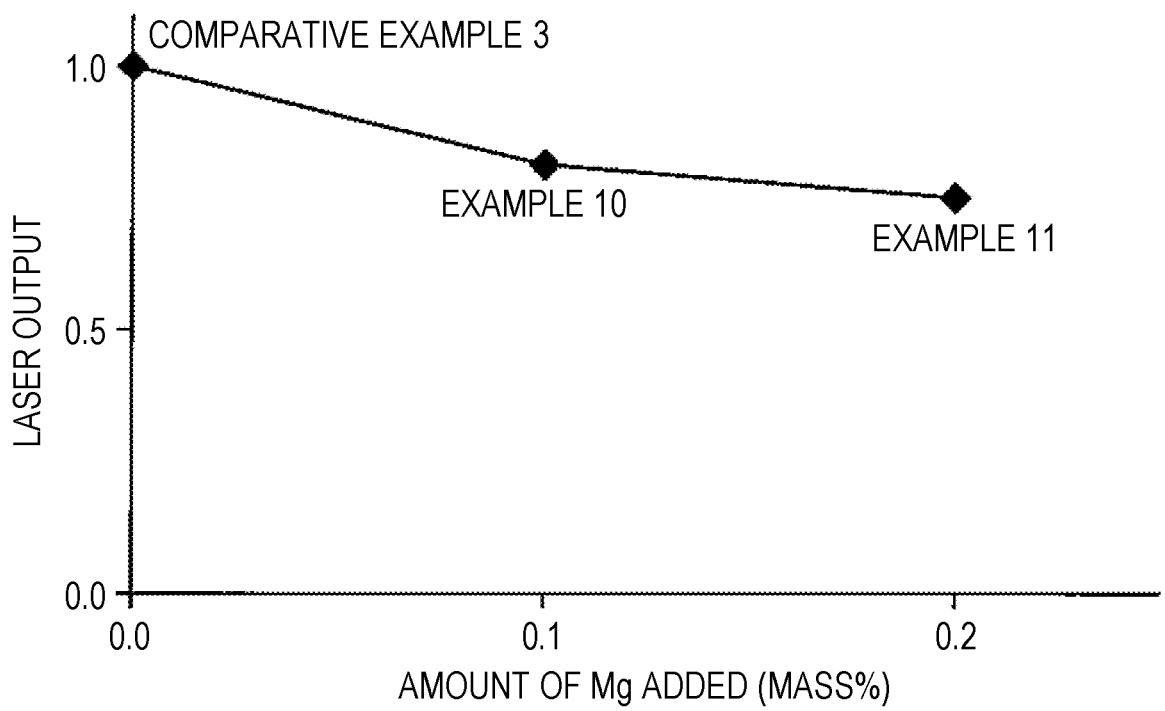
FIG. 2C is a graph showing results of a weldability test for copper-based alloys of Examples 10 and 11 and Comparative Example 3.

The results are shown in the following Tables 2 to 4 and FIGS. 2A to 2C. Here, the contents of Mg in the tables are approximate values and accurate values are shown in Table 1-1 and Table 1-2.

TABLE 2

| | Welding lower limit | | |
|---|---|---|---|
| Embodiment 1 | Mg (mass %) | laser output | Powder form |
| Comparative Example 1 | 0.00 | 1 | Alloy powder |
| Example 1 | 0.02 | 0.81 | Alloy powder |
| Example 2 | 0.05 | 0.81 | Alloy powder |
| Example 3 | 0.20 | 0.69 | Alloy powder |
| Example 4 | 1.53 | 0.69 | Alloy powder |

TABLE 3

| Embodiment 2 | Mg (mass %) | Welding lower limit laser output | Powder form |
|---|---|---|---|
| Comparative Example 2 | 0.00 | 1 | Alloy powder |
| Example 5 | 0.05 | 0.86 | Alloy powder |
| Example 6 | 0.10 | 0.86 | Alloy powder |
| Example 7 | 0.20 | 0.79 | Alloy powder |
| Example 8 | 0.93 | 0.86 | Alloy powder |

TABLE 4

| Embodiment 3 | Mg (mass %) | Welding lower limit laser output | Powder form |
|---|---|---|---|
| Comparative Example 3 | 0.00 | 1 | Alloy powder |
| Example 10 | 0.10 | 0.81 | Alloy powder |
| Example 11 | 0.20 | 0.75 | Alloy powder |

Based on these test results, it can be understood that the copper-based alloy of the present disclosure had superior weldability with respect to the copper-based alloys of Comparative Examples 1 to 3 containing no Mg.

Figure 3:
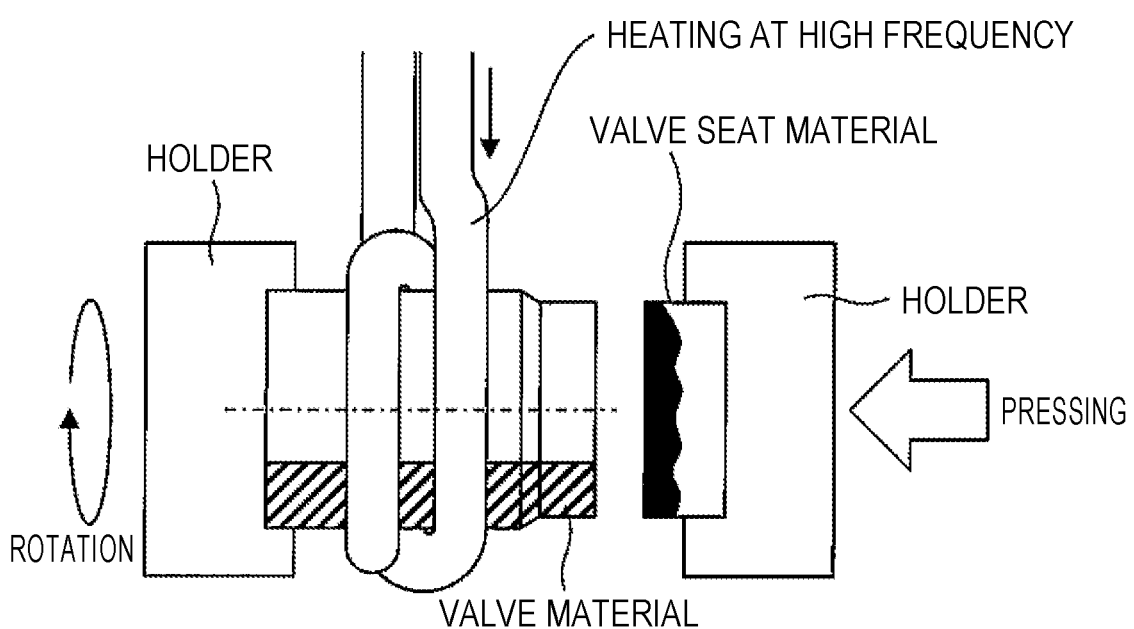
FIG. 3 is a diagram schematically showing a state in which a wear resistance test is performed on a test piece having a cladding layer.

(2) The wear resistance test was performed using a test device shown in FIG. 3 under the following conditions, and an amount of loss due to wear (mg) was evaluated.

Atmosphere: air

Load: 9 MPa

Test temperature 473 K

Counterpart material: SUH (heat resistant steel)

Rotational speed: 0.3 m/s

A wear depth after the test as an amount of loss due to wear was measured on the seat side (sample side) and the valve side (counterpart material side). The results are shown in the following Table 5. Here, amounts of Mg added in the table are approximate values and accurate values are shown in Table 1-1 and Table 1-2.

TABLE 5

| | | | Mg (mass %) | | | |
|---|---|---|---|---|---|---|
| | | | 0 | 0.05 | 0.2 | 0.3 |
| Amount of loss due to wear (mg) | Embodiment 1 | | Comparative Example 1 | — | Example 3 | — |
| | | Average (n2) | 4 | — | 4 | — |
| | | Tolerance+ | 0.2 | — | 0.6 | — |
| | | Tolerance− | 0.1 | — | 0.6 | — |
| | Embodiment 2 | | Comparative Example 2 | Example 5 | — | Example 9 |
| | | Average (n2) | 3 | 3.8 | — | 2.4 |
| | | Tolerance+ | 0.8 | 0.7 | — | 0.2 |
| | | Tolerance− | 0.8 | 0.6 | — | 0.2 |
| | Embodiment 3 | | Comparative Example 3 | — | Example 11 | — |
| | | Average (n2) | 6.8 | — | 3.7 | — |
| | | Tolerance+ | 0.1 | — | 0.8 | — |
| | | Tolerance− | 0.1 | — | 0.8 | — |

Based on the test results, it can be understood that the copper-based alloy of the present disclosure had the same or superior wear resistance as compared with the copper-based alloys of Comparative Examples 1 to 3 containing no Mg.

(3) Tensile Strength Test

The tensile strength test was performed according to JIS Z2201 (test piece shape No. 13B) and JIS Z2241.

Figure 4A:
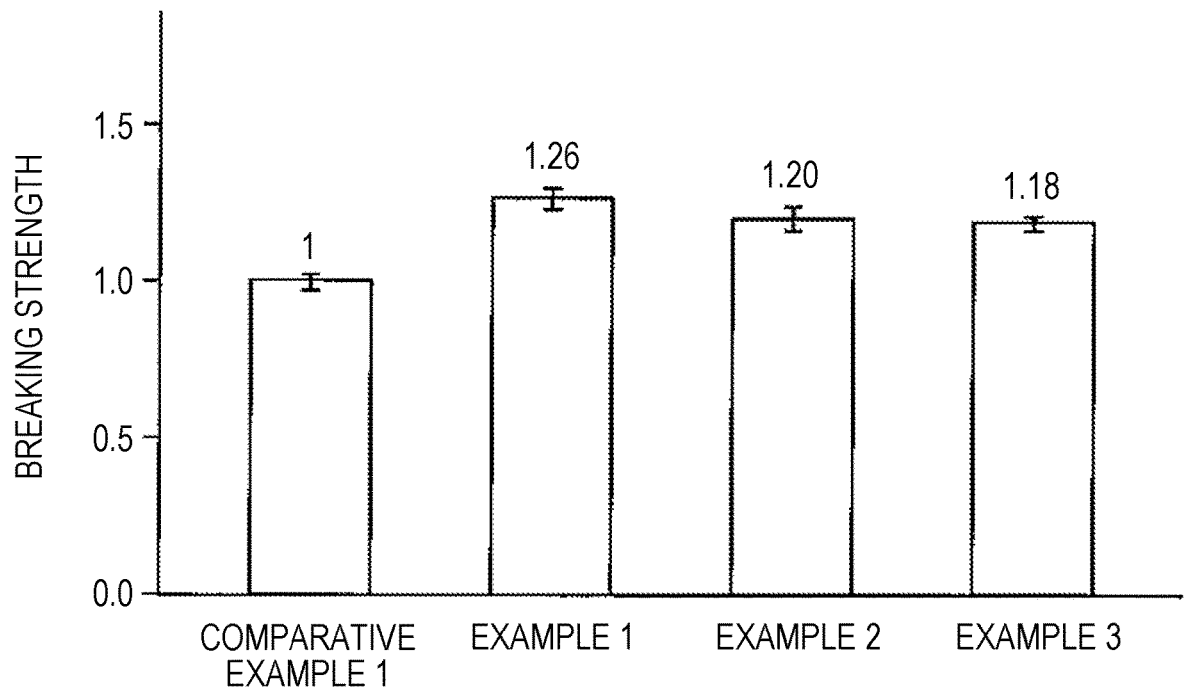
FIG. 4A is a graph showing results of a tensile strength test for copper-based alloys of Examples 1 to 3 and Comparative Example 1.
Figure 4B:
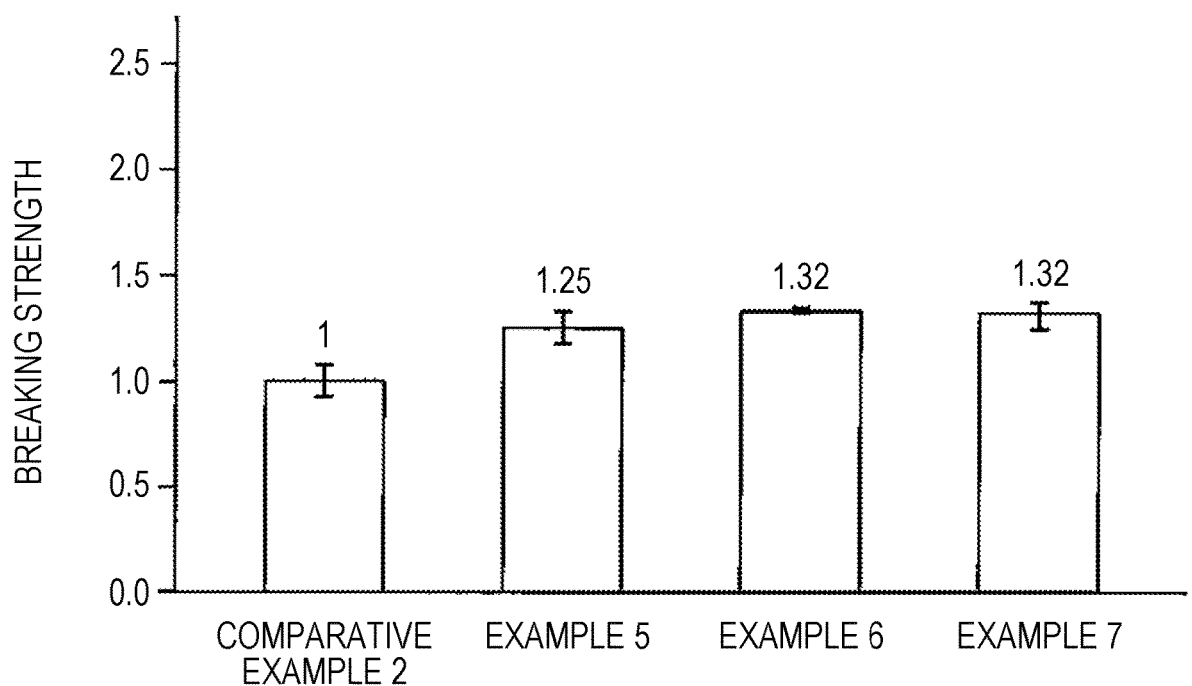
FIG. 4B is a graph showing results of a tensile strength test for copper-based alloys of Examples 5 to 7 and Comparative Example 2.
Figure 4C:
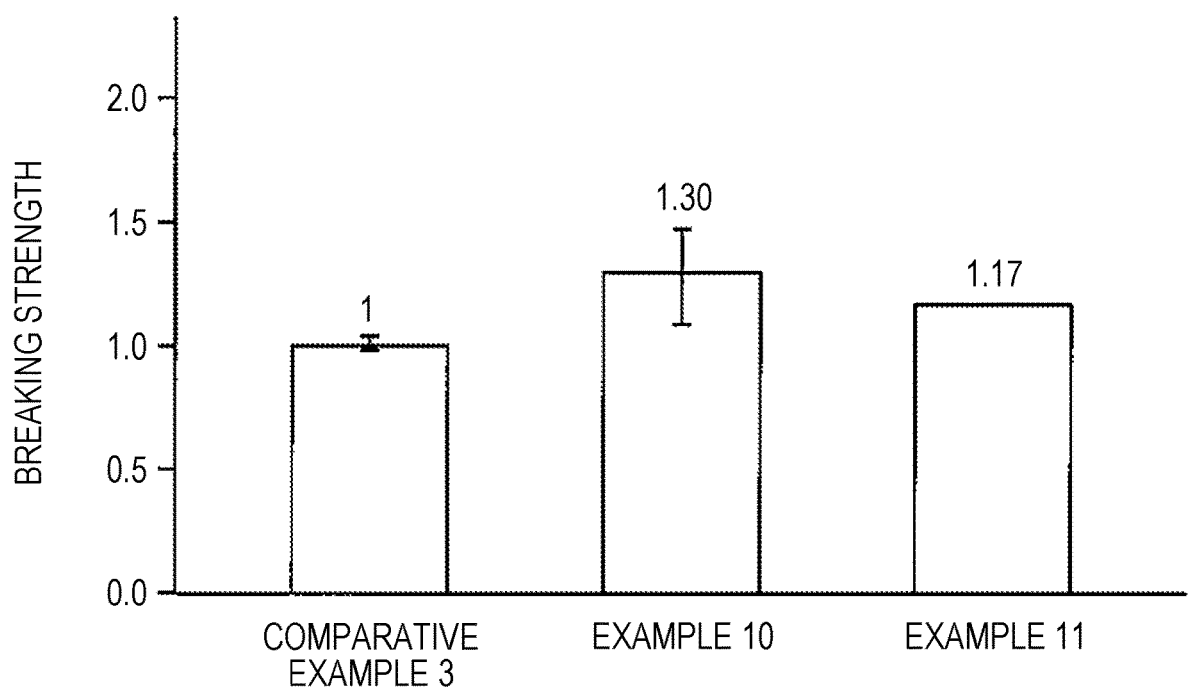
FIG. 4C is a graph showing results of a tensile strength test for copper-based alloys of Examples 10 and 11 and Comparative Example 3.

The results are shown in the following Table 6 and FIGS. 4A to 4C. Here, amounts of Mg added in the table are approximate values and accurate values are shown in Table 1-1 and Table 1-2.

TABLE 6

| | | | Mg (mass %) | | | | |
|---|---|---|---|---|---|---|---|
| | | | 0 | 0.02 | 0.05 | 0.1 | 0.2 |
| Breaking strength | Embodiment 1 | | Comparative Example 1 | Example 1 | Example 2 | — | Example 3 |
| | | Average (n3) | 1 | 1.26 | 1.20 | — | 1.18 |
| | | +Tolerance | 0.018 | 0.031 | 0.035 | — | 0.017 |
| | | −Tolerance | 0.031 | 0.037 | 0.041 | — | 0.028 |
| | Embodiment 2 | | Comparative Example 2 | — | Example 5 | Example 6 | Example 7 |
| | | Average (n3) | 1 | — | 1.25 | 1.32 | 1.32 |
| | | +Tolerance | 0.073 | — | 0.073 | 0.016 | 0.049 |
| | | −Tolerance | 0.073 | — | 0.073 | 0.011 | 0.073 |

TABLE 6-continued

| | | Mg (mass %) | | | | |
|---|---|---|---|---|---|---|
| | | 0 | 0.02 | 0.05 | 0.1 | 0.2 |
| Embodiment 3 | | Comparative Example 3 | — | — | Example 10 | Example 11 |
| | Average (n3) | 1 | — | — | 1.30 | 1.17 |
| | +Tolerance | 0.037 | — | — | 0.172 | 0.000 |
| | −Tolerance | 0.019 | — | — | 0.213 | 0.000 |

Based on these test results, it can be understood that the copper-based alloy of the present disclosure had the same or superior strength as compared with the copper-based alloys of Comparative Examples 1 to 3 containing no Mg.

The copper-based alloy of the present disclosure can be applied as a copper-based alloy constituting a sliding part of a sliding member typified by a valve system member such as a valve seat and a valve of an internal combustion engine.

What is claimed is:

1. A valve system member comprising:
   a substrate formed of a material selected from the group consisting of aluminum, an aluminum-based alloy, iron, an iron-based alloy, copper, and a copper-based alloy; and
   a cladding part welded on a surface of the substrate, the cladding part being formed of a copper-based alloy comprising:
   Ni: 15.8-17.5 mass %,
   Si: 2.08-2.89 mass %,
   Fe: 7.03-9.06 mass %,
   Mg: 0.02-1.53 mass %,
   Mo: 6.55-9.09 mass %,
   optionally, Cr: 1.0 mass % to 15.0 mass %, and
   remainder Cu and a total of 5 mass % or less of other elements,
   wherein the valve system member is for an internal combustion engine or sliding member.

2. The valve system member according to claim 1, wherein the substrate is formed of an aluminum-based alloy.

3. The valve system member according to claim 1, wherein the copper-based alloy has a weldability such that a welding lower limit laser output at which deposition efficiency of the copper-based alloy onto an aluminum alloy-based substrate using a laser cladding device is 80% or more is at least 0.86 times less than the welding lower limit laser output at which 80% deposition efficiency is achieved when no Mg is included in the copper-based alloy.

4. The valve system member according to claim 3, wherein the copper-based alloy has a wear resistance such that a wear amount after rotating at 0.3 m/s while pressing under a load of 9 MPa at 473 K against a heat resistant steel is 6.5 mg or less.

5. The valve system member according to claim 1, wherein the copper-based alloy has a wear resistance such that a wear amount after rotating at 0.3 m/s while pressing under a load of 9 MPa at 473 K against a heat resistant steel is 6.5 mg or less.

6. The valve system member according to claim 1, wherein the copper-based alloy does not comprise NbC.

7. The valve system member according to claim 1, wherein the copper-based alloy comprises Cr: 1.0 mass % to 15.0 mass %.

8. The valve system member according to claim 1, wherein the remainder of the copper-based alloy is Cu and a total of 2 mass % or less of other elements.

9. The valve system member according to claim 8, wherein the remainder of the copper-based alloy is Cu and a total of 1 mass % or less of other elements.

* * * * *